(12) United States Patent
Ward et al.

(10) Patent No.: US 10,209,721 B2
(45) Date of Patent: Feb. 19, 2019

(54) HOT WATER HEATER SYSTEMS AND METHODS FOR CONTROLLING ELECTRONIC MIXING VALVES

(71) Applicant: Haier US Appliance Solutions, Inc., Wilmington, DE (US)

(72) Inventors: Shaun Michael Ward, Louisville, KY (US); Paul Goodjohn, Crestwood, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 33 days.

(21) Appl. No.: 15/239,928

(22) Filed: Aug. 18, 2016

(65) Prior Publication Data

US 2018/0052473 A1 Feb. 22, 2018

(51) Int. Cl.
| | |
|---|---|
| *G05D 7/06* | (2006.01) |
| *G05D 23/19* | (2006.01) |
| *F24H 9/12* | (2006.01) |
| *F24H 9/20* | (2006.01) |
| *G05D 27/02* | (2006.01) |

(52) U.S. Cl.
CPC ........... *G05D 7/0635* (2013.01); *F24H 9/124* (2013.01); *F24H 9/2007* (2013.01); *G05D 23/1902* (2013.01); *G05D 23/1917* (2013.01); *G05D 23/1927* (2013.01); *G05D 27/02* (2013.01)

(58) Field of Classification Search
CPC ..... F24H 9/124; F24H 9/2007; G05D 7/0635; G05D 23/1902; G05D 23/1917; G05D 23/1927; G05D 27/02
USPC ........................................................ 700/285
See application file for complete search history.

(56) References Cited

U.S. PATENT DOCUMENTS

| | | | | |
|---|---|---|---|---|
| 4,969,598 | A * | 11/1990 | Garris | G05D 23/1393 137/3 |
| 2002/0153425 | A1* | 10/2002 | Mountford | G05D 23/1393 236/12.12 |
| 2010/0044449 | A1* | 2/2010 | Tessier | F24F 11/0086 236/94 |
| 2013/0158720 | A1* | 6/2013 | Zywicki | F24F 11/006 700/276 |
| 2014/0069516 | A1 | 3/2014 | Shapira | |
| 2016/0377323 | A1* | 12/2016 | Ward | F24H 9/2007 122/14.1 |

FOREIGN PATENT DOCUMENTS

| | | |
|---|---|---|
| DE | 202012104942 U1 | 1/2013 |
| WO | WO0212760 A1 | 2/2002 |

* cited by examiner

*Primary Examiner* — Kenneth M Lo
*Assistant Examiner* — Michael W Choi
(74) *Attorney, Agent, or Firm* — Dority & Manning, P.A.

(57) ABSTRACT

Hot water heater systems including electronic mixing valves and methods for controlling such valves are provided. An electronic mixing valve provides a flow of water in a mixed output line. A method includes monitoring an input temperature of cold water supplied to the valve, storing a value of the input temperature, and setting a position limit of the valve based on the stored value, wherein the position limit of the valve is greater than a fully closed position of the valve and less than a fully open position of the valve.

12 Claims, 5 Drawing Sheets

HOT WATER HEATER SYSTEMS AND METHODS FOR CONTROLLING ELECTRONIC MIXING VALVES

FIELD OF THE INVENTION

The present disclosure relates generally to hot water heater systems, and more particularly to methods for controlling electronic mixing valves of hot water heater systems.

BACKGROUND OF THE INVENTION

Mixing valves in hot water heater systems are generally used to increase the hot water capacity of hot water tanks of the hot water heaters. By increasing the temperature of the hot water in the hot water tank, and then mixing the hot water flow from the hot water tank with cold water in a mixing valve, the realized capacity of the hot water tank is increased.

However, improvements could be made to presently known methods for controlling such mixing valves. For example, improvements to the response time for outputting a desired water temperature from a hot water heater that utilizes a mixing valve could be advantageous. Many presently-known mixing valves are operated by controllers which utilize proportional, integral and derivative gains and temperature tolerances. In some cases, such controllers and electronic mixing valves can enter oscillatory states.

Accordingly, improved hot water heater systems and methods for controlling electronic mixing valves are desired. In particular, improvements such as but not limited to reducing the range of movement of the valve would result in advantages, such as reduced wear on the valve, reduced temperature oscillation, decreased response time, improved mixing performance, and improved fault detection.

BRIEF DESCRIPTION OF THE INVENTION

Aspects and advantages of the invention will be set forth in part in the following description, or may be obvious from the description, or may be learned through practice of the invention.

In one exemplary embodiment, a method of controlling an electronic mixing valve for a hot water heater, the electronic mixing valve providing a flow of water in a mixed output line, is provided. The method includes monitoring an input temperature of water supplied to the valve, storing an extremum of the input temperature, setting a position limit of the valve based on the stored extremum, wherein the position limit of the valve is greater than a fully closed position of the valve and less than a fully open position of the valve, and operating the valve within a range constrained by the position limit of the valve.

In another exemplary embodiment, a method of controlling an electronic mixing valve for a hot water heater, the electronic mixing valve providing a flow of water in a mixed output line, is provided. The method includes monitoring an input temperature of cold water supplied to the valve, storing a value of the input temperature, setting a position limit of the valve based on the stored value, and operating the valve within a range constrained by the position limit of the valve.

In another exemplary embodiment, a hot water heater is provided. The hot water heater includes a cold water supply, a hot water tank, an electronic mixing valve, the valve connected to the cold water supply, the hot water tank, and a mixed output line, the valve operable to receive variable input from each of the cold water supply and the hot water tank and to provide a mixed output flow of water in the mixed output line, a motor in communication with the valve, the motor operable to move the valve between a fully open position and a fully closed position, a temperature sensor operable to sense the temperature in one of the cold water supply and the hot water tank, and a controller in operative communication with the temperature sensor and the motor, the controller operable to monitor the sensed temperature, store an extremum of the sensed temperature, and set a position limit of the valve based on the stored extremum, wherein the position limit of the valve is greater than the fully closed position of the valve and less than the fully open position of the valve.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

U.S. Pat. No. 9,244,466, issued Jan. 26, 2016, entitled "Electronic Mixing Valve in Standard Hot Water Heater," is incorporated by reference in its entirety herein.

Figure 1:
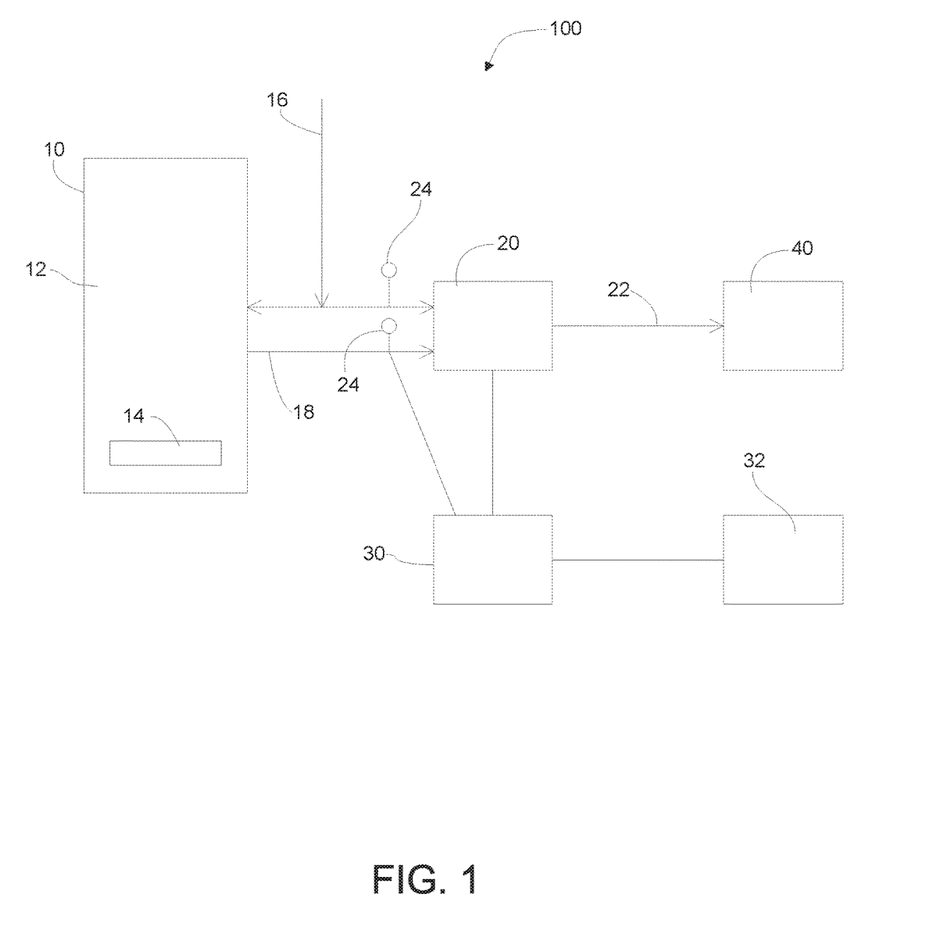
FIG. 1 is a schematic view of a hot water heater system in accordance with an exemplary embodiment of the present disclosure.
Figure 2:
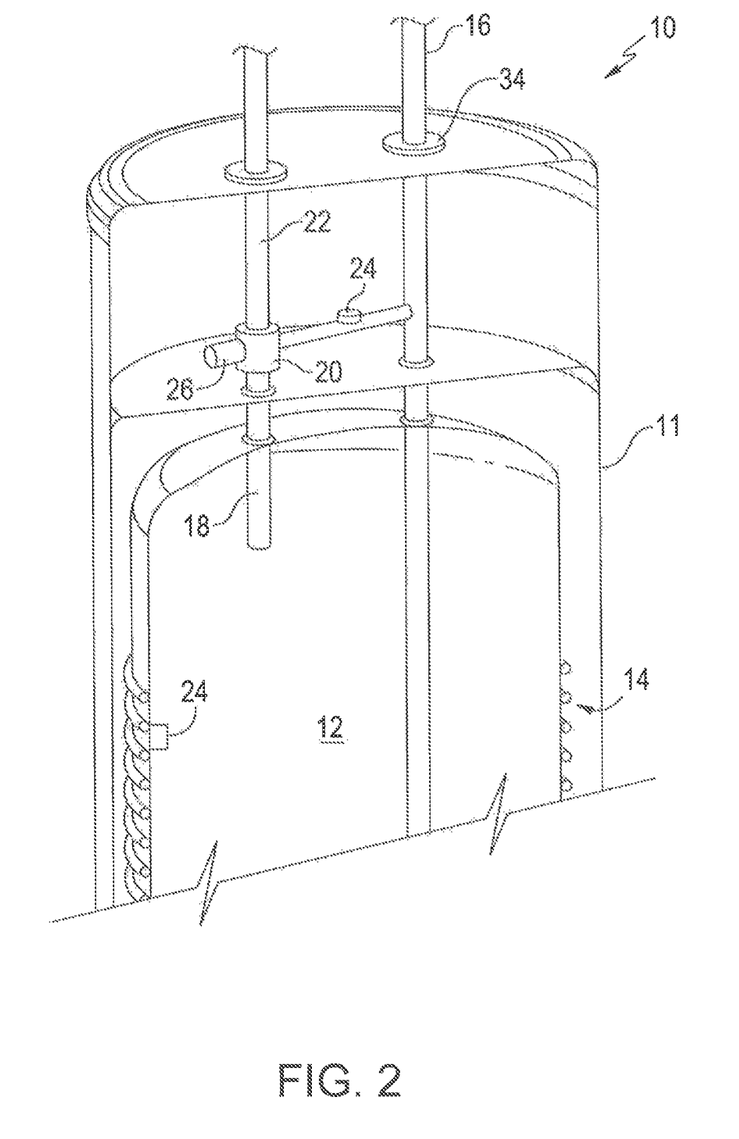
FIG. 2 is a partial perspective, section view of a hot water heater in accordance with an exemplary embodiment of the present disclosure.

FIG. 1 illustrates an exemplary hot water heater system 100 and hot water heater 10 therefor. As shown, the hot water heater system 100 generally includes hot water heater 10, an electronic mixing valve 20 and a controller 30. In the exemplary embodiment of FIGS. 1 and 2, the hot water heater 10 includes a reservoir or water storage tank 12 for storing water and a heat source 14 for heating the water stored in the tank 12. The tank 12 and heat source 14 are generally housed within a casing 11 of the hot water heater 10. In exemplary embodiments, such as is illustrated in FIG. 2, the hot water heater 10 is a heat pump water heater, and the heat source 14 is thus a heat pump heating element. It should be understood, however, that the present disclosure is not limited to heat pump water heaters, and rather that any suitable water heaters may be utilized. Further, any suitable heat sources 14, including gas burners, heat pumps, electric resistance elements, microwave elements, induction elements, or any other suitable heating element or combinations thereof, may be utilized. The hot water heater 10 includes an inlet 34 for receiving water from inlet line 16 for delivery into the tank 12. The water in the inlet line 16 is in an initial non-heated, i.e., "cold," state, e.g., as supplied from the water supply line of a home or other building. The hot water heater 10 also includes an outlet line 18 for supplying water from the tank 12 that has been heated to a pre-determined temperature, generally referred to herein as "hot" water. In the exemplary embodiment shown in FIGS. 1 and 2, the outlet line 18 is coupled to the mixing valve 20. Thus, the mixing valve 20 receives a cold water input, i.e., non-heated water from the inlet line 16, and a hot water input, i.e., heated water from the outlet line 18, and produces a mixed output in output line 22. Valve 20 mixes the hot water input with the cold water input such that the output temperature of the water from the mixing valve 20 is reduced with respect to the temperature of the hot water in tank 12. The mixing valve 20 includes a mixed outlet or output line 22 that delivers the mixed output water to the portions of the plumbing system 40 to which the hot water heater 10 is connected, generally referred to herein as the hot water portions of the plumbing system 40. The plumbing system 40 can be part of a residential, commercial or other water plumbing system that incorporates a hot water heater.

In some exemplary embodiments, such as the examples illustrated in FIGS. 1 and 2, the mixing valve 20 is fluidly connected to the inlet line 16 and the outlet line 18. The mixing valve 20 may be coupled to the plumbing system 40 via the mixed output line 22. As illustrated for example in FIG. 2, in some exemplary embodiments, the mixing valve 20 may be an electronic mixing valve actuated by a motor 26, which may be a stepper motor. Suitable stepper motors may include motors configured to move the valve 20 over a range of discrete positions between a fully open position (i.e., supplying only hot water from within the tank 12) and a fully closed position (i.e., supplying only cold water from inlet line 16). For example, the fully closed position may correspond to step zero and the fully open position may correspond to any number, e.g., ten, or in some exemplary embodiments it may go up to eleven. Additionally, some exemplary embodiments may include a stepper motor 26 that ranges up to five thousand steps or more, i.e., in some exemplary embodiments the fully open position may correspond to step five thousand, and in such exemplary embodiments a half-open position may correspond to step two thousand five hundred. In other exemplary embodiments, the mixing valve 20 may include for example, a solenoid operated water valve or a gear or motor driven water valve. In alternate embodiments, any suitably controlled water mixing valve can be utilized to provide precise flow control such as for example, a servo motor coupled with a valve.

In exemplary embodiments, the mixing valve is disposed within the casing 11, such as is illustrated in FIG. 2. Alternatively, however, the mixing valve may be external to the hot water heater 10.

In some exemplary embodiments, such as those shown in FIGS. 1 and 2, the controller 30 may be an electronic controller that is operatively coupled to the hot water heater 10 and the mixing valve 20. Controller 30 may include or be operatively coupled to, or be in communication with, one or more processor(s) that are operable to monitor and control the flow of hot water from the hot water tank 12 and heated water from the mixing valve 20, as well as execute the processes that are generally described herein. In one embodiment the controller 30 can include or receive machine-readable instructions that are executable by one or more processors or other suitable processing device(s). The processor(s) can include program code to perform particular tasks and/or data manipulations, as are generally described herein. In one embodiment, the processor(s) can include or be coupled to a memory and input/output devices. The memory typically includes both non-volatile memory, such as semiconductor type random access memory, and non-volatile memory, such as a magnetic computer disk.

In some exemplary embodiments, the controller 30 may be operatively coupled to and between, and in communication with, the hot water heater 10 and the mixing valve 20. For example, the controller 30 may control the mixing valve 20 to increase or decrease the temperature of the water in the mixed output line 22. This can include, for example, regulating one or more valves that are part of or coupled to the mixing valve 20 to increase or reduce the amount of hot water from the tank 12 that is being supplied to the mixing valve 20 or that flows through mixing valve 20 to mixed output line 22.

The controller 30 may also include or be coupled to a user interface 32. In some exemplary embodiments, the controller 30 and user interface 32 may form part of a home energy management (HEM) system. The user interface 32 may comprise any suitable control or display that will allow a user to program, set and adjust the functions and settings of the hot water heater system 100, as are generally described herein. In some exemplary embodiments, the user interface 32 may comprise a display interface, such as a touch screen display. In some exemplary embodiments, the user interface 32 may also or instead include buttons or switches for manipulating and programming the settings of the system 100, including, for example, the set-point temperature. In some exemplary embodiments, the user interface 32 may comprise or be part of a control panel for the hot water heater 10. The user interface 32 may also be located remotely from the hot water heater 10, and may be accessible through a computing device or a web based interface.

In some exemplary embodiments, such as illustrated in FIGS. 1 and 2, the system 100 includes one or more temperature sensors 24 for detecting and monitoring the temperature of the water in the different portions of the system 100. In the exemplary illustrations of FIGS. 1 and 2, sensors 24, which may be thermistors, thermocouples, resistance temperature detectors, or other temperature sensors, are shown on or thermally coupled to one or more of the inlet line 16, the outlet line 18, mixed output line 22 and the hot water tank 12. The sensor(s) 24 are generally configured to provide one or more signals or commands to the controller 30 that will allow the controller 30 to detect and determine temperature values for the water in various portions of the hot water system 100. For example, a hot water input temperature may be measured in tank 12 (See, e.g., FIG. 2) and/or in supply line 18 (See, e.g., FIG. 1).

In some exemplary embodiments, the sensors 24 may be coupled to the controller 30 via a wired or wireless communication connection or interface. For purposes of the description herein, wireless communication connections and interfaces can include, but are not limited to, wireless radio, WI-FI, BLUETOOTH, ZIGBEE and Ethernet wireless type devices and interfaces.

The behavior of the mixing valve 20 (i.e., output temperature as a function of valve position) may not be linear or consistent depending on flow rate, water temperatures, water pressure or any other various parameter. In such instances, behavior of valve 20 may not be well suited for calculating based on a formula or equation. Thus, in some exemplary embodiments, it may be advantageous to empirically determine the valve characteristics. Nonetheless, it is within the scope of the present subject matter to develop a correlation between valve position and output temperature through other means, e.g., calculating based on a formula, which may be suitable for some instances wherein parameters such as flow rate, water temperature, and/or water pressure are relatively consistent.

The output temperature from mixing valve 20 depends on several other factors in addition to the valve position, such as the hot water input temperature and the cold water input temperature, that can vary over time. For example, during non-flow or standby periods, when hot water is not being consumed from the hot water tank 12, the water temperature at or near the inlet 34 may become elevated due to conduction from the tank 12. In such cases, the input temperature of "cold" water supplied to mixing valve 20 will be highest at the beginning of a draw, especially when that draw occurs after a long standby time. During a draw, as the relatively warm water in inlet 34 is flushed out by colder water, the input temperature of "cold" water supplied to mixing valve 20 may decrease non-linearly, e.g., asymptotically, over a period of time until a minimum temperature is reached. Accordingly, in such cases, the required minimum open position for the valve (i.e., minimum amount of hot water input to achieve the desired output temperature) varies over time, e.g., as the cold input temperature decreases, the minimum open position increases. In some exemplary embodiments, a lookup table which correlates temperature values and valve positions may be provided, e.g., may be programmed into memory associated with controller 30. For example, the lookup table may associate a certain value for the temperature of incoming cold water in line 16 with the corresponding valve position of the mixing valve that results in a desired temperature in the mixing valve output line 22. In exemplary embodiments wherein valve 20 is actuated by a stepper motor 26, a minimum open position may be, e.g., step 60 out of 100 to output the desired temperature when the cold input temperature is at its lowest. Thus, the controller 30 may in some exemplary embodiments be operable to initialize at a predetermined minimum open value that is greater than a fully closed position of the valve, e.g., in embodiments where valve 20 is actuated by a stepper motor 26, the starting point can be greater than zero, which results in reduced operating range of the valve with concomitant reduction in wear on the valve components, as well as decreased response time, among other advantages. For example, the controller 30 may in some embodiments be a proportional-integral-derivative (PID) controller, in such embodiments the PID loop can be constrained by, e.g., a certain minimum which is greater than a fully closed position of the valve and/or a certain maximum which is less than a fully open position of the valve. Such constraining extrema may be predetermined, either empirically or theoretically, and stored in a lookup table wherein they are correlated or otherwise associated with at least one external parameter, e.g., cold water input temperature or hot water input temperature.

As another non-limiting example of the potential advantages of the present subject matter, improved fault detection can be provided. A fault condition such as a stuck valve may be indicated if the temperature does not stabilize within the normal response time. Thus, because the normal response time, i.e., the time it takes from the beginning of a hot water draw until the temperature stabilizes, is reduced, the time it takes to detect, e.g., a stuck valve, may also be reduced.

Figure 3:
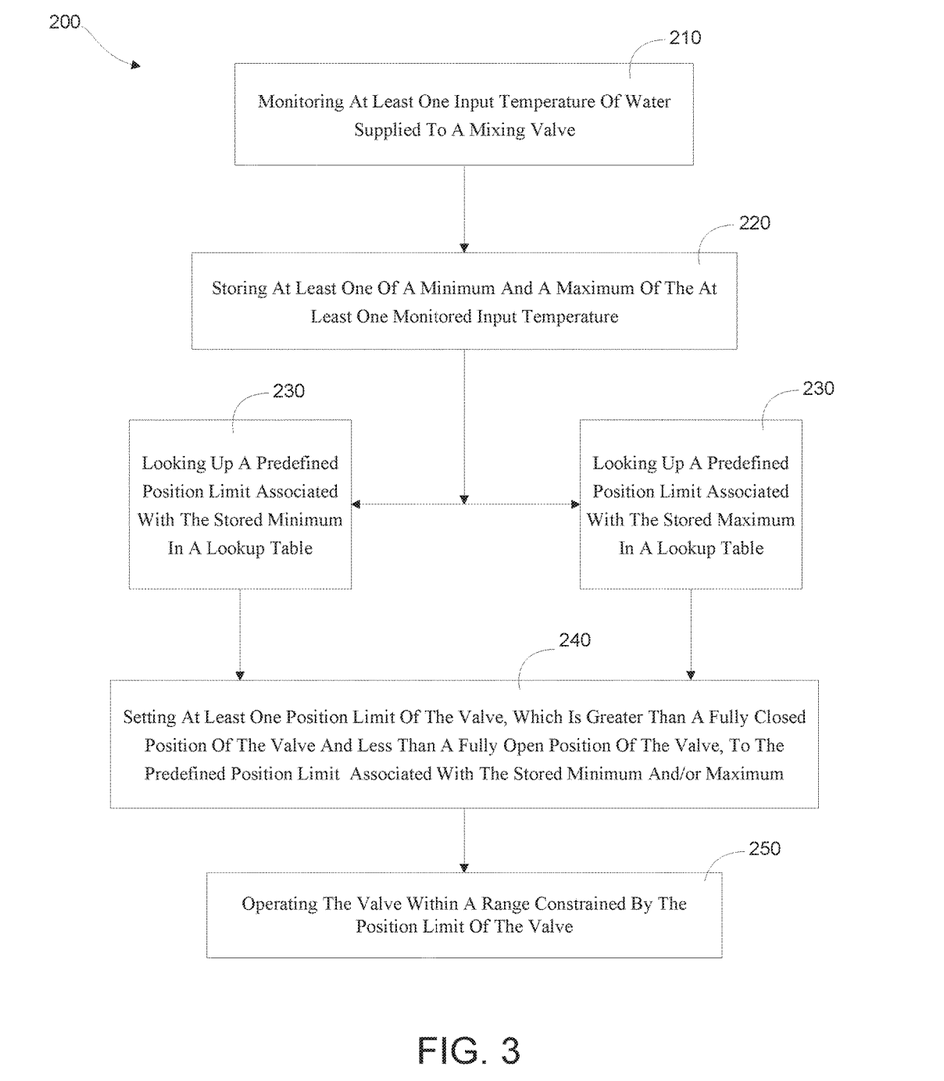
FIG. 3 is a flow chart illustrating a method for controlling an electronic mixing valve for a hot water heater in accordance with an exemplary embodiment of the present disclosure.
Figure 4:
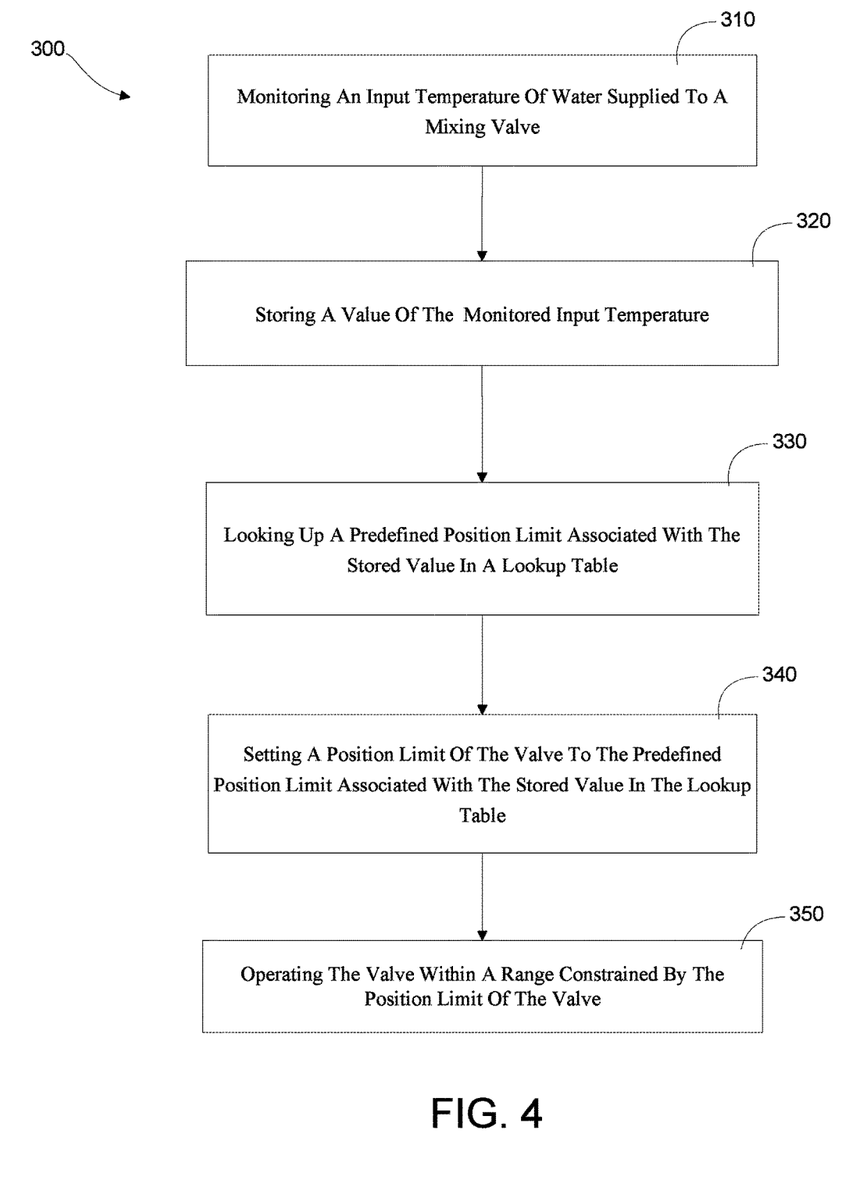
FIG. 4 is a flow chart illustrating another method for controlling an electronic mixing valve for a hot water heater in accordance with an exemplary embodiment of the present disclosure.

Referring now to FIGS. 3 and 4, various exemplary embodiments of methods for controlling electronic mixing valves 20 for hot water heater systems 100 are provided. In general, such methods provide improved operation of controllers 30, electronic mixing valves 20, and systems 100 in general. For example, such methods may reduce the risk of electronic mixing valves 20 encountering unstable conditions and entering oscillatory states. Further, such methods may reduce the response time of the system 100, e.g., the time required to provide the desired water temperature in output line 22.

It should be noted that controllers 30 as disclosed herein are capable of and may be operable to perform any methods and associated method steps as disclosed herein.

For example, referring to FIG. 3, a method 200 for controlling an electronic mixing valve 20 for a hot water heater system 100 may include, for example, the step 210 of monitoring at least one input temperature of water supplied to the mixing valve 20. The input temperature may be the cold water input temperature and/or the hot water input temperature. The input temperature(s) may be determined based on signals received from the temperature sensor(s) 24, and may be continuously or regularly monitored by controller 30.

Method 200 may further include, for example, the step 220 of storing a value of the input temperature. The stored value can generally correspond to the temperature being monitored in exemplary embodiments. That is, when the monitored temperature is the cold water input temperature, the stored value may be a minimum temperature, and when the monitored temperature is the hot water input temperature the stored value may be a maximum temperature. In some exemplary embodiments, the stored value may be a daily value, e.g., when the stored value is a minimum, the daily minimum temperature for each day in a set of days may be stored. The set of days for which values of stored may be about three days to about thirty days. In some exemplary embodiments, the stored value may be stored within a moving seven-day window, that is, upon start up a daily value may be stored every day for the first seven days, and beginning on the eighth day a new value is added to the stored set each day and the oldest value is discarded. Thus, the operative value may be the outlying value within a limited time frame, e.g., the operative stored minimum based upon which the position limit is determined may be the lowest daily minimum over a moving seven-day window. In such exemplary embodiments, seasonal variations in temperature can be accounted for, e.g., a minimum temperature value stored in January is unlikely to be valuable in July in most cases.

Method 200 may further include, for example, the step 230 of looking up a predefined position limit associated with the stored minimum or maximum in a lookup table. As illustrated in FIG. 3, various exemplary embodiments may include looking up a predefined position limit associated with the stored minimum or looking up a predefined position limit associated with the stored maximum, or looking up predefined position limits associated with both a stored minimum and a stored maximum. The lookup table can be derived empirically or may contain theoretical or unobserved correlations between output temperature and valve position. One possible process to empirically characterize the valve may include determining an input temperature of water supplied to the valve, moving the valve between a fully closed position and a fully open position while monitoring the mixed output temperature, and correlating the mixed output temperature with the relative position of the valve. Then, a position limit of the valve may be defined based on the correlation of the mixed output temperature and the relative position of the valve, wherein the defined position limit of the valve correlates to the desired output temperature. The defined position limit may also, in some exemplary embodiments be associated with the input temperature in a lookup table. The lookup table may include multiple position limits associated with a range of input temperatures. For example, four position limits may be provided in a lookup table, with a position limit associated with each of four ranges of input temperatures, e.g., for cold water input temperature, such ranges may be, below forty-five degrees Fahrenheit (<45° F.), between forty-five degrees Fahrenheit and seventy degrees Fahrenheit (45° F. to 70° F.), between seventy degrees Fahrenheit and ninety degrees Fahrenheit (70° F. to 90° F.), and above ninety degrees Fahrenheit (>90° F.).

Method 200 may further include, for example, the step 240 of setting at least one position limit of the valve to the predefined position limit associated with the stored minimum or maximum. The position limit is greater than a fully closed position of the valve and less than a fully open position of the valve. Method 200 may further include the step 250 of operating the valve within a range constrained by the position limit of the valve. Thus, the operating range of the valve 20 may be advantageously constrained, as discussed above.

Another exemplary method 300, as illustrated in FIG. 4, may include the step 310 of monitoring an input temperature of water supplied to mixing valve 20, the step 320 of storing a value of the monitored input temperature, the step 330 of looking up a predefined position limit associated with the stored value in a lookup table, the step 340 of setting a position limit of the valve to the predefined position limit associated with the stored value in the lookup table, and the step 350 of operating the valve within a range constrained by the position limit of the valve.

The several exemplary embodiments illustrated and described herein are by way of example and without limitation. Features illustrated or described as part of one embodiment can be used with another embodiment to yield a still further embodiment. In various exemplary embodiments, the temperature monitoring step may include monitoring the temperature of the hot water input and/or the cold water input. Further, various exemplary embodiments may include storing one or more values of the monitored temperature. That is, in various exemplary embodiments, the cold water input temperature may be monitored and a minimum thereof stored, while the hot water input temperature may also or instead be monitored and a maximum thereof stored, or in other exemplary embodiments, both the cold water input temperature and the hot water input temperature may be monitored and an average temperature value may be stored. Additional other variations and combinations of features as would be recognized by one of ordinary skill in the art from the examples illustrated and described herein are possible and all are within the scope of the present subject matter.

Figure 5:
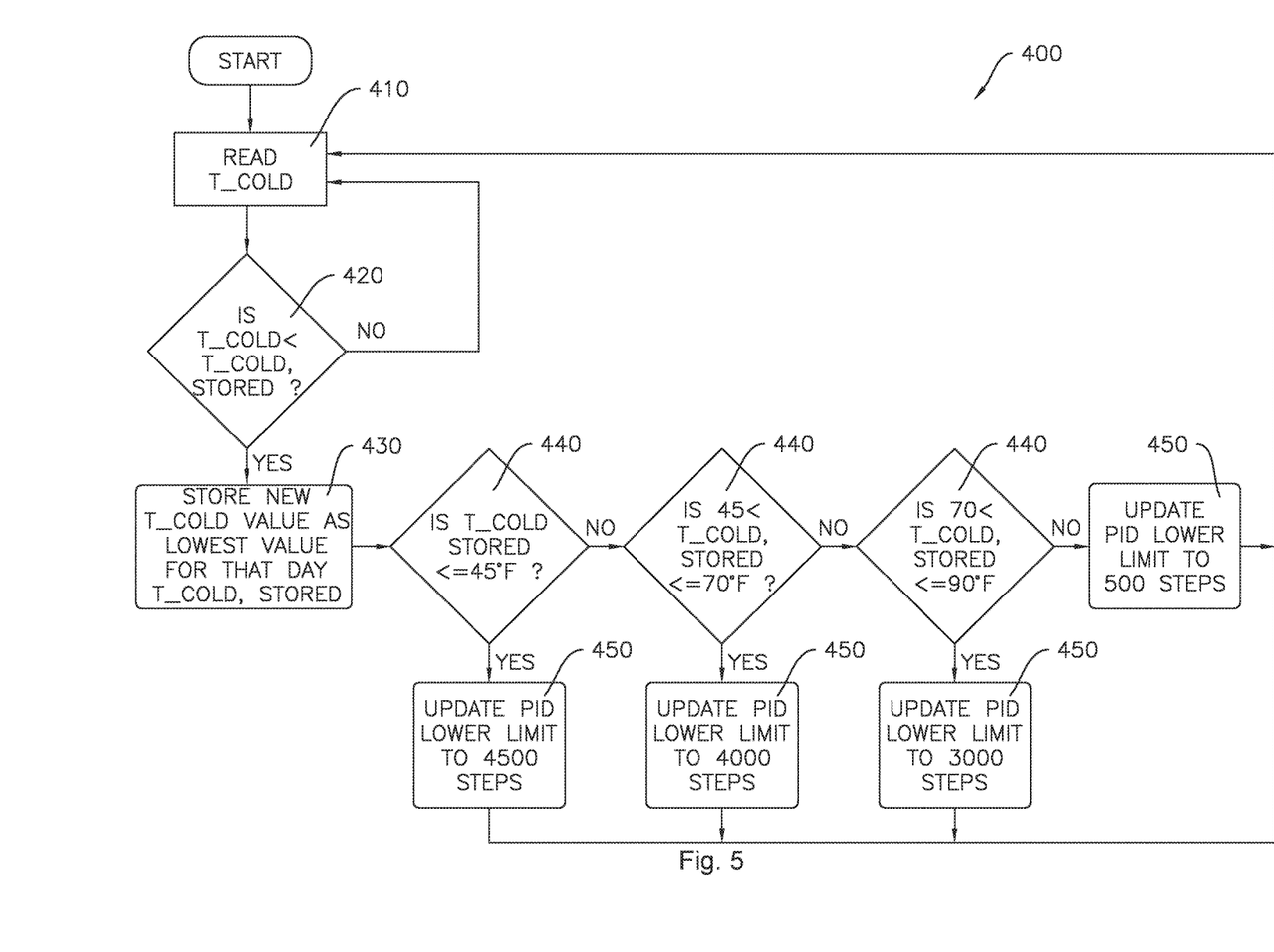
FIG. 5 is a flow chart illustrating another method for controlling an electronic mixing valve for a hot water heater in accordance with an exemplary embodiment of the present disclosure.

One possible combination of the various embodiments is illustrated for example in FIG. 5. As illustrated in FIG. 5, such exemplary method 400 includes an embodiment wherein the input temperature is cold water input temperature, the stored value is a minimum temperature, the controller 30 includes a PID control loop, and motor 26 is a stepper motor with a range from zero to six thousand. In this particular exemplary embodiment, method 400 may include a step 410 of measuring cold water input temperature ($T_{COLD}$), a step 420 of comparing the measured $T_{COLD}$ to a stored minimum value of $T_{COLD}$, and a step 430 of storing the minimum value of $T_{COLD}$. Also illustrated for example in FIG. 5, the method 400 may further include a step 440 of comparing the stored minimum value to a set of four ranges of values (e.g., in a lookup table according to the example as discussed above in paragraph 33) and a step 450 of setting a minimum valve position (e.g., PID lower limit in this example) based on the stored value of $T_{COLD}$.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of controlling an electronic mixing valve for a hot water heater, the electronic mixing valve providing a flow of water in a mixed output line, the method comprising:
    monitoring an input temperature of water supplied to the valve from a cold water supply;
    storing a minimum of the input temperature;
    looking up a predefined position limit associated with the stored minimum in a lookup table;
    setting a position limit of the valve to the predefined position limit;
    and
    operating the valve within a range constrained by the position limit of the valve;
    wherein the position limit of the valve is greater than a fully closed position of the valve and less than a fully open position of the valve.

2. The method of claim 1, wherein the stored extremum is a daily extremum.

3. The method of claim 1, wherein the step of storing an extremum of the input temperature further comprises storing the extremum within a moving seven-day window.

4. The method of claim 1, wherein the predefined position limit is a minimum open position, and the step of looking up a predefined position limit comprises looking up a predefined minimum open position associated with the stored minimum temperature in a lookup table, and setting the minimum open position of the valve to the predefined minimum open position.

5. A method of controlling an electronic mixing valve for a hot water heater, the electronic mixing valve providing a flow of water in a mixed output line, the method comprising:
monitoring an input temperature of cold water supplied to the valve;
storing a value of the input temperature;
looking up a predefined position limit associated with the stored value in a lookup table;
setting a position limit of the valve to the predefined position limit;
and
operating the valve within a range constrained by the position limit of the valve.

6. The method of claim 5, wherein the position limit of the valve is a minimum open position.

7. The method of claim 5, wherein the stored value is a daily minimum temperature.

8. The method of claim 5, wherein the stored value is a daily maximum temperature.

9. The method of claim 5, wherein the stored value is a daily average temperature.

10. A hot water heater, comprising:
a cold water supply;
a hot water tank;
an electronic mixing valve, the valve connected to the cold water supply, the hot water tank, and a mixed output line, the valve operable to receive variable input from each of the cold water supply and the hot water tank and to provide a mixed output flow of water in the mixed output line;
a motor in communication with the valve, the motor operable to move the valve between a fully open position and a fully closed position;
a temperature sensor operable to sense the temperature in one of the cold water supply and the hot water tank; and
a controller in operative communication with the temperature sensor and the motor, the controller operable to monitor the sensed temperature, store an extremum of the sensed temperature, look up a predefined position limit associated with the stored extremum in a lookup table, set a position limit of the valve to the predefined position limit, and operate the motor to move the valve within a range constrained by the position limit of the valve, wherein the position limit of the valve is greater than the fully closed position of the valve and less than the fully open position of the valve.

11. The hot water heater of claim 10, wherein the temperature sensor is operable to sense the temperature in the cold water supply, and the controller is operable to store a minimum of the sensed temperature and set a position limit of the valve based on the stored minimum by looking up a predefined minimum open position associated with the stored minimum temperature in a lookup table, and setting the minimum open position of the valve to the predefined minimum open position.

12. The hot water heater of claim 10, wherein the temperature sensor is operable to sense the temperature in the hot water tank, and the controller is operable to store a maximum of the sensed temperature and set a position limit of the valve based on the stored maximum by looking up a predefined maximum open position associated with the stored maximum temperature in a lookup table, and setting the maximum open position of the valve to the predefined maximum open position.

* * * * *